APPARATUS FOR DIE CUTTING AND SCORING

Original Filed May 13, 1968 10 Sheets-Sheet 1

INVENTOR.
CLOVIS F. DESLAURIERS
BY John A. Seifert
ATTORNEY

APPARATUS FOR DIE CUTTING AND SCORING

Original Filed May 13, 1968 10 Sheets-Sheet 2

INVENTOR.
CLOVIS F. DESLAURIERS
BY
John A. Seifert
ATTORNEY

APPARATUS FOR DIE CUTTING AND SCORING

Original Filed May 13, 1968 10 Sheets-Sheet 3

INVENTOR.
CLOVIS F. DESLAURIERS
By John A. Seifert
ATTORNEY

APPARATUS FOR DIE CUTTING AND SCORING

Original Filed May 13, 1968 10 Sheets-Sheet 4

INVENTOR.
CLOVIS F. DESLAURIERS
BY John A. Seifert
ATTORNEY

APPARATUS FOR DIE CUTTING AND SCORING

Original Filed May 13, 1968 10 Sheets-Sheet 5

INVENTOR.
CLOVIS F. DESLAURIERS

BY John A. Seifert
ATTORNEY

APPARATUS FOR DIE CUTTING AND SCORING

Original Filed May 13, 1968 10 Sheets-Sheet 6

INVENTOR.
CLOVIS F. DESLAURIERS
BY John A. Seifert
ATTORNEY

APPARATUS FOR DIE CUTTING AND SCORING

Original Filed May 13, 1968 10 Sheets-Sheet 7

INVENTOR.
CLOVIS F. DESLAURIERS
BY John A. Seifert
ATTORNEY

APPARATUS FOR DIE CUTTING AND SCORING

Original Filed May 13, 1968 10 Sheets-Sheet 8

INVENTOR.
CLOVIS F. DESLAURIERS
BY
John A. Seifert
ATTORNEY

APPARATUS FOR DIE CUTTING AND SCORING

Original Filed May 13, 1968 10 Sheets-Sheet 9

INVENTOR.
CLOVIS F. DESLAURIERS

By

John A. Seifert

ATTORNEY

APPARATUS FOR DIE CUTTING AND SCORING

Original Filed May 13, 1968 10 Sheets-Sheet 10

INVENTOR.
CLOVIS F. DESLAURIERS
BY
John A. Seifert
ATTORNEY

United States Patent Office

Re. 27,768
Reissued Oct. 2, 1973

27,768

APPARATUS FOR DIE CUTTING AND SCORING

Clovis F. Deslauriers, Harbor Drive,
Port Chester, N.Y. 10573

Original No. 3,504,584, dated Apr. 7, 1970, Ser. No. 728,695, May 13, 1968. Application for reissue Apr. 6, 1972, Ser. No. 241,853
Int. Cl. B26d *3/08, 9/00*
U.S. Cl. 83—9 7 Claims

Matter enclosed in heavy brackets [ ] appears in the original patent but forms no part of this reissue specification; matter printed in italics indicates the additions made by reissue.

ABSTRACT OF THE DISCLOSURE

A pressure applying member having a segmental arcuate surface is *oscillated* [reciprocated] about a horizontal axis and synchronously to the reciprocation of a die bed. Said arcuate surface is provided with cam actuated stops yieldingly mounted to position a paper sheet on said arcuate surface and the die bed. The pressure applying member is reciprocated by cranks imparting [to and fro] *actuated* motion or [rotary reciprocation] to toothed segments meshing with pinions connected to the axis of the pressure applying member. The pressure applying member is provided with toothed segments meshing with racks arranged on the die bed to reciprocate said die bed synchronously with the pressure applying member. The die bed is supported during the cutting and scoring operation by a roller *which is rotated* [rotated to and fro] by the reciprocation of die bed through racks carried by the die bed and meshing with pinions connected to the axis of the roller.

*SUMMARY OF THE INVENTION*

The apparatus includes means for supporting paper sheets in stack formation and arranged with reciprocating fingers to remove the lowermost paper sheet from the stack and deliver said paper sheet to mating rollers rotated in opposite directions and feeding said paper sheet to a series of mating endless belts which deliver said paper sheet to the arcuate surface of the pressure applying member and to the die bed with the forward edge of the paper sheet abutting the stops on the pressure applying member. After the paper sheet is cut and scored, it is delivered by the pressure applying member to an endless perforated web continuously traveling in an oblique plane at the place of discharge of the cut and scored paper sheet from the pressure applying member and in a horizontal plane relative to suction means where it is discharged from the apparatus by the continuous travel of said web.

*DESCRIPTION OF THE PREFERRED EMBODIMENTS OF THE INVENTION*

The operative parts of the apparatus forming the embodiment of the invention are supported on a table 11, and between side walls 12 and a front wall 13.

Figure 1:
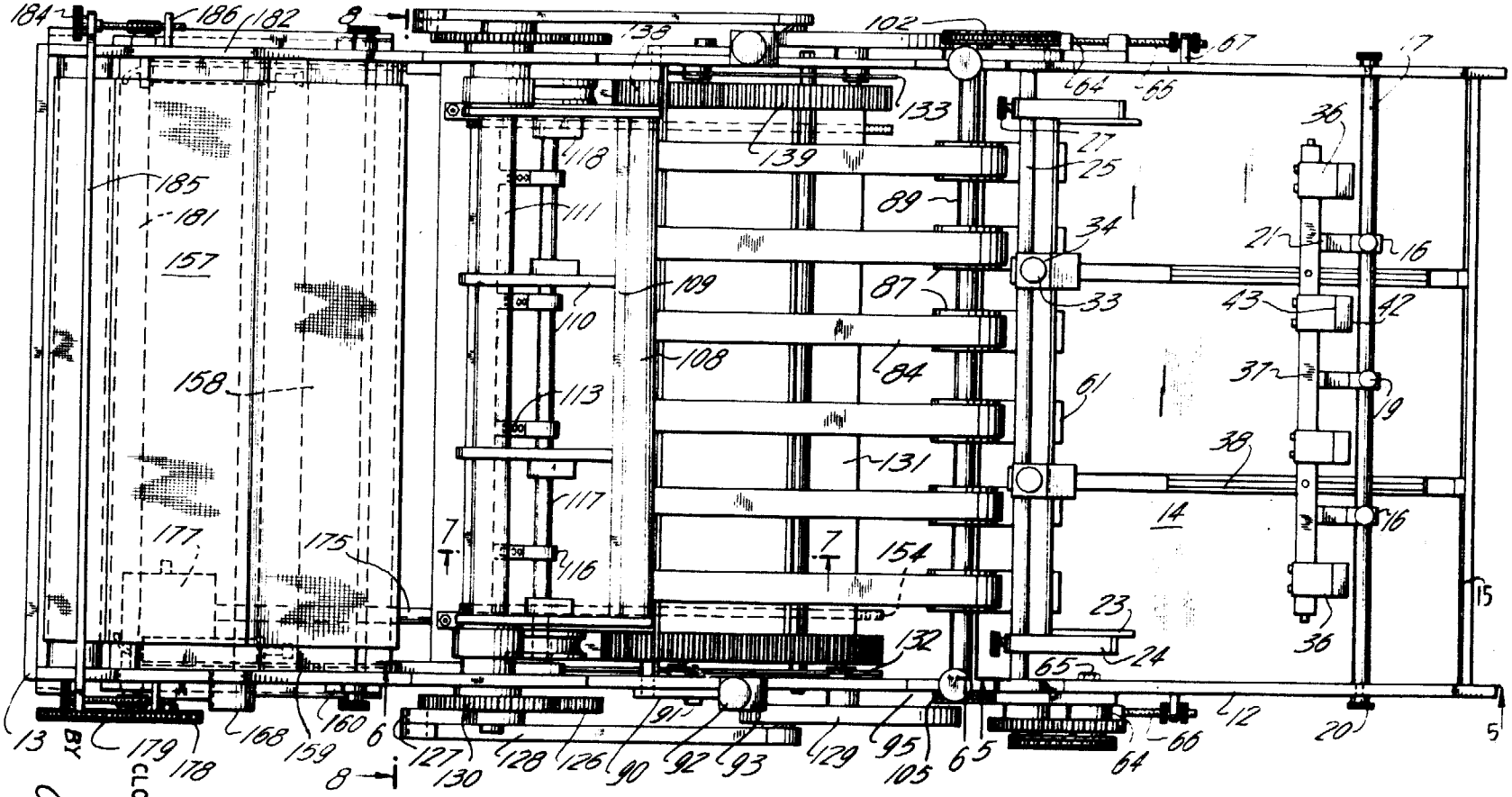
FIGURE 1 is a top plan view of the apparatus.
Figure 2:
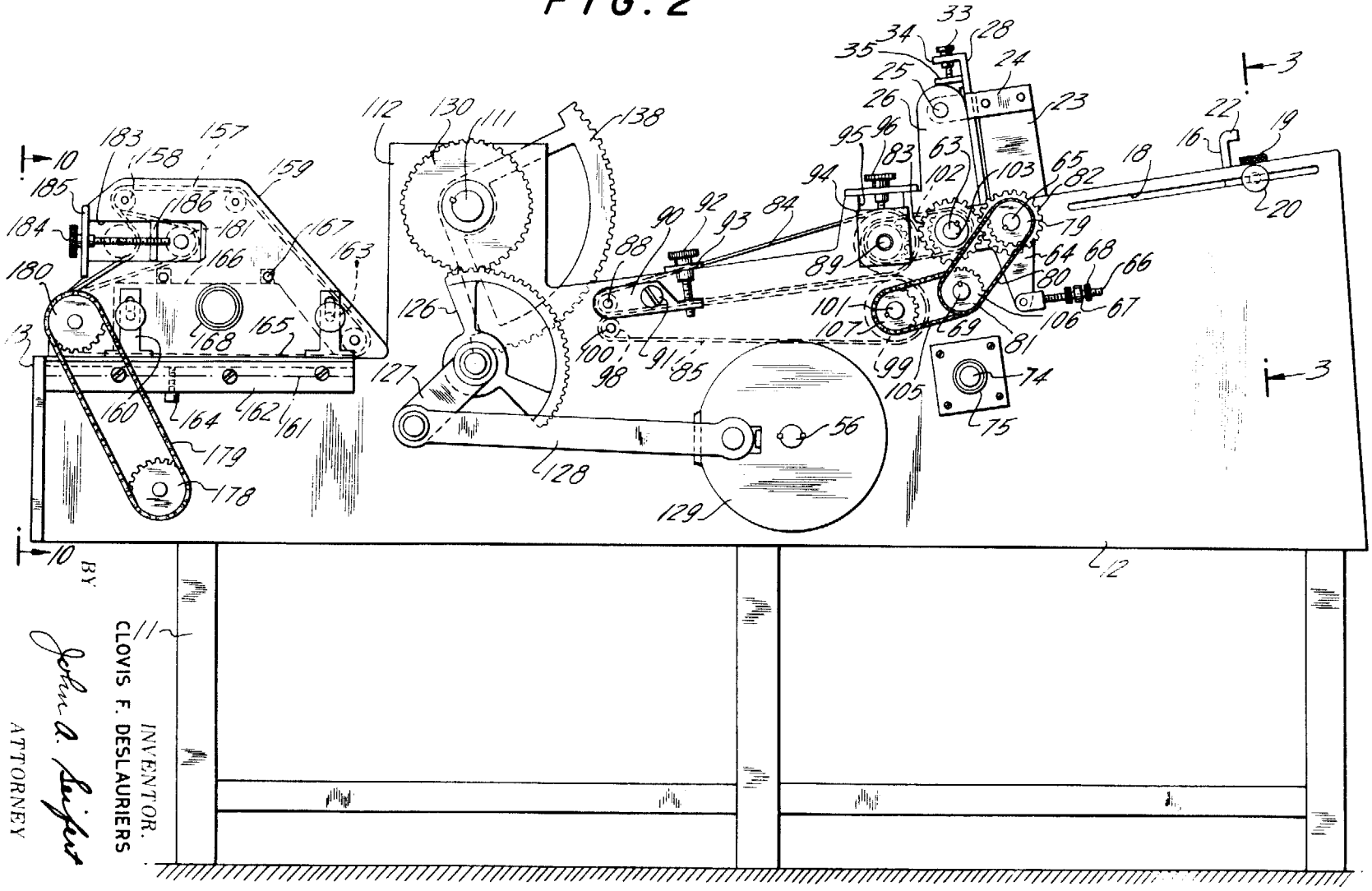
FIGURE 2 is a side elevational view of the apparatus looking from the bottom of FIGURE 1.
Figure 5:
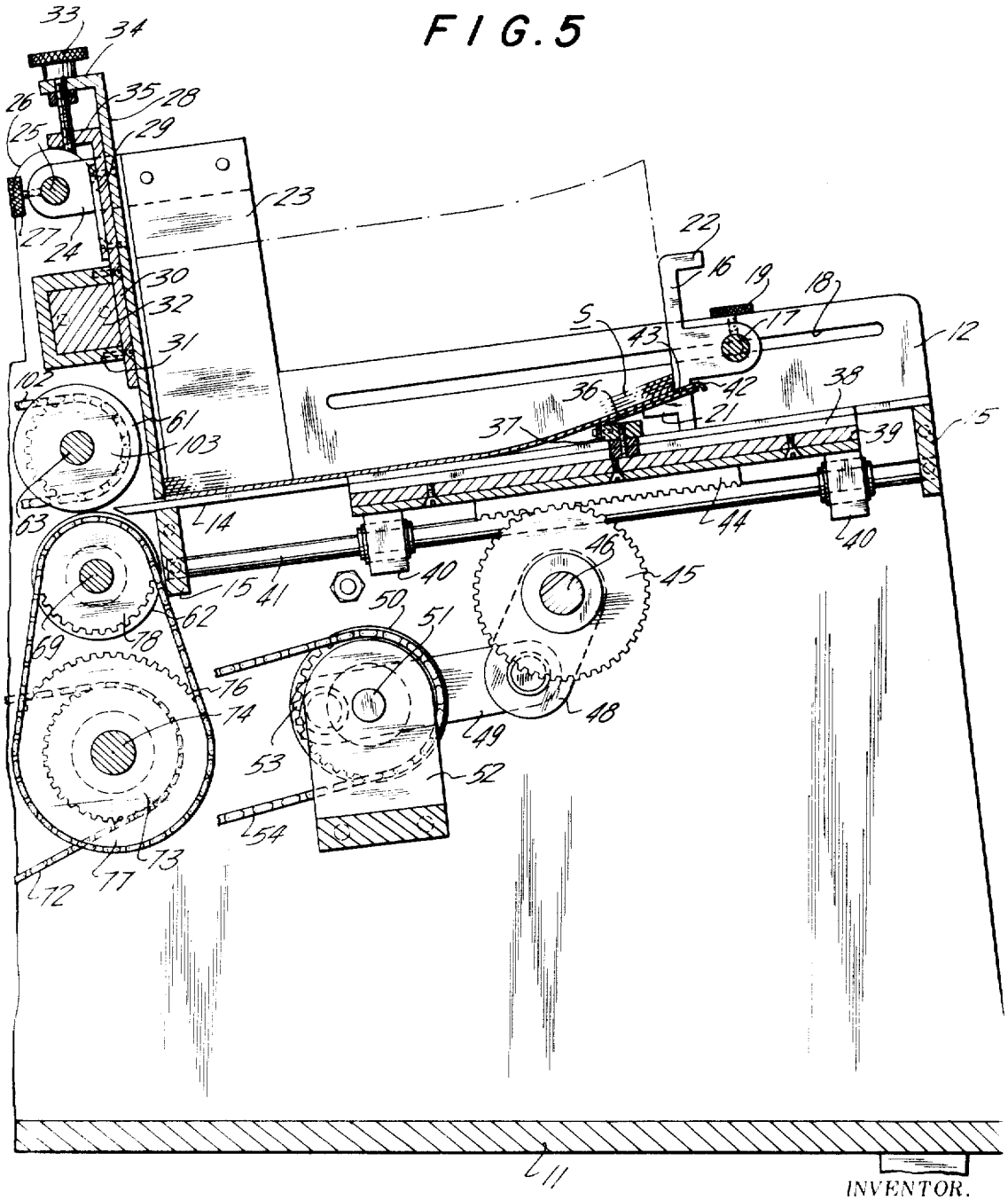
FIGURE 5 is a side elevational view, on an enlarged scale, looking from the line 5—5 of FIGURE 1 in the direction of the arrows to show the means for supporting paper sheets in stack formation and the reciprocating fingers.

FIGURES 1, 2, 3 and 5 show paper sheets s, which may be cardboard or corrugated board, supported in stack formation on a platform 14 mounted between the side walls 12 at a declining angle from the rear of the apparatus by beams 15 secured to the side walls 12. The rear edge portions of the paper sheets s are raised from the platform 14 and retained in stacked formation by rear guide members 16 slidably mounted on a rod 17 having reduced end portions slidably supported in a slot 18 in each side wall 12. The guide members 16 are retained in adjusted position on the rod 17 by set-screws 19, and the rod 17 is retained in adjusted position in the slots 18 by clamping nuts 20. Each guide member 16 is provided with a forwardly extending lug 21 adjacent the bottom of said guide member and on which lug 21 the rear edge portion of the lowermost paper sheet s is supported, and a rearwardly extending lug 22 at the top of said guide member by which the guide member is adjusted on the rod 17. The sides of the paper sheets are retained in stack formation by a pair of side guide members or plates 23, each member 23 being secured at its upper portion to an arm 24 slidably mounted on a rod 25 having the ends secured in a vertical extension 26 of each side wall 12. The side guide members 23 are retained in adjusted position by set-screws 27. The front edges of the paper sheets s are maintained in stack formation by two guide members 28, each member having a pair of opposed angle-pieces 29 on the front face thereof to slidingly engage the opposite side portions of a member 30 having a U-shaped portion 31 mounted on a bar 32 secured at its ends to the vertical extensions 26. The guide members 28 are adjusted to position the bottom edges of said members 28 a predetermined distance from the platform 14 depending on the thickness of the paper sheets s. Said adjustment is accomplished by a screw 33 rotatably mounted in a lateral extension 34 at the top of each member 28 and said screw adjustably engaged in a lateral extension 35 at the top of each member 30. The top edges of the side walls 12 will slope at the same angle as the platform 14 and so will all the stacking elements, as shown in FIGURES 2 and 5.

Figure 3:
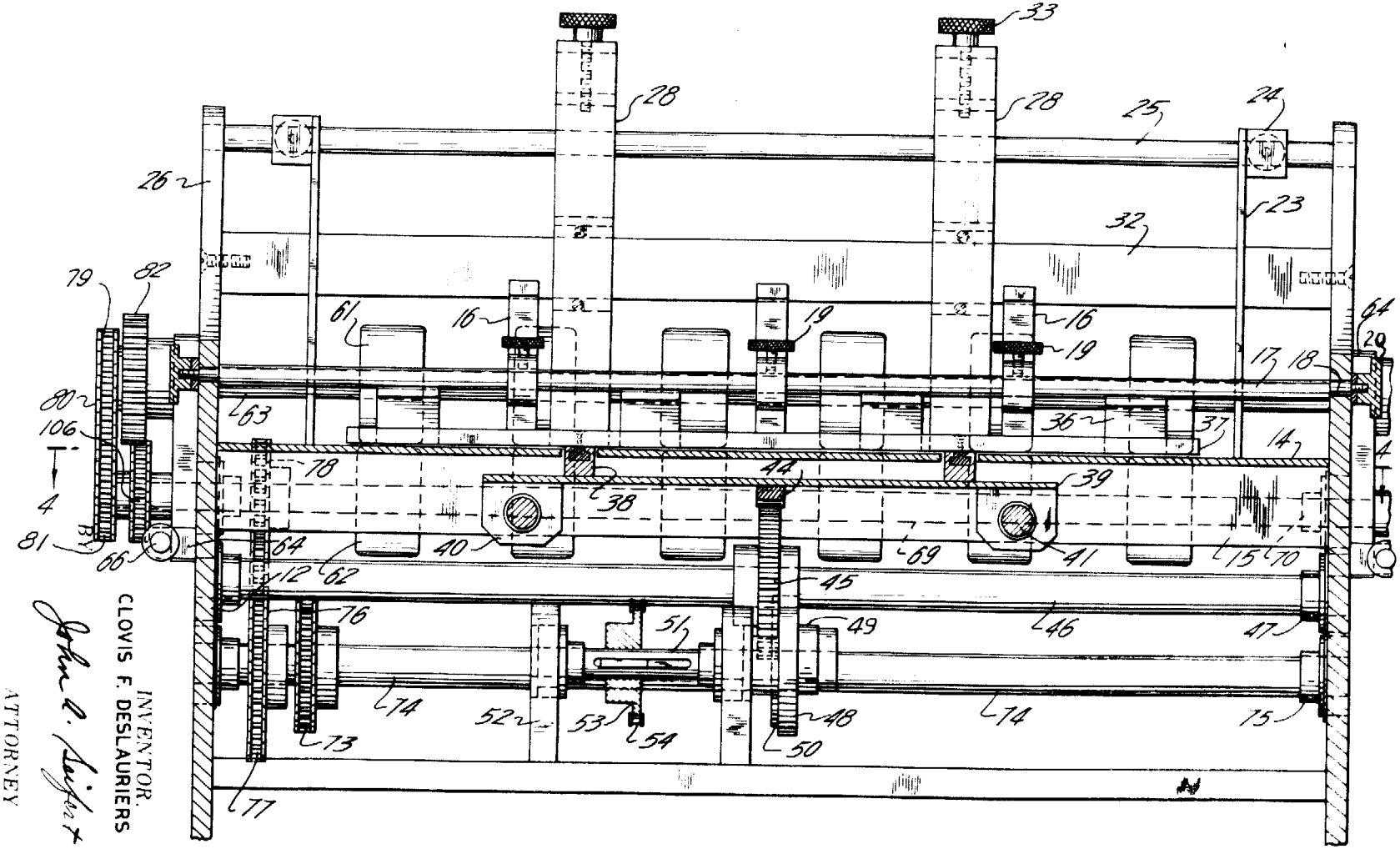
FIGURE 3 is a cross-sectional view, on an enlarged scale, taken on the line 3—3 of FIGURE 2 looking in the direction of the arrows to show the means for supporting paper sheets in stack formation and the reciprocating fingers.
Figure 4:
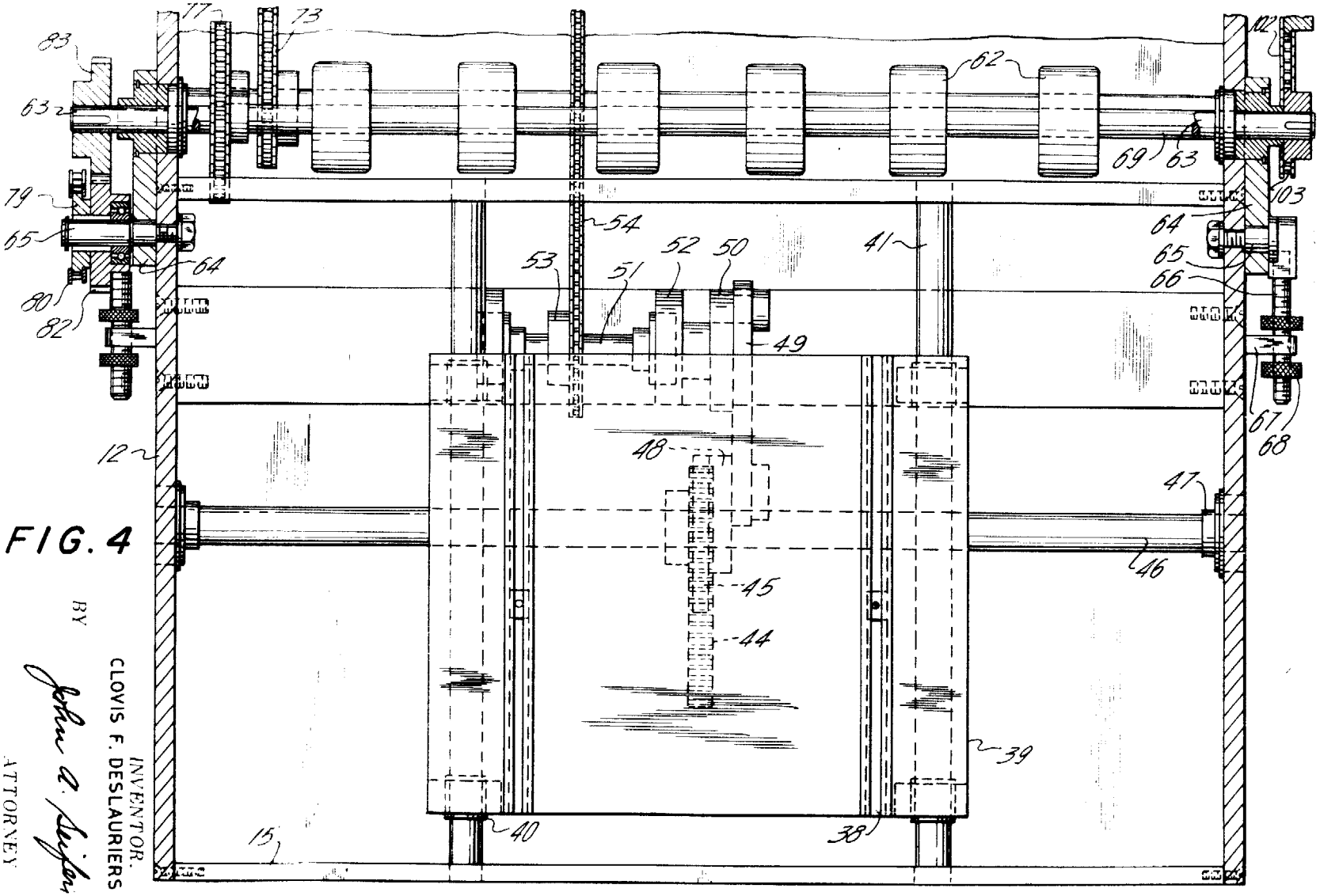
FIGURE 4 is a top plan sectional view taken on the line 4—4 of FIGURE 3 looking in the direction of the arrows to show means for actuating the reciprocating fingers.

The lowermost or bottom paper sheet s is removed from the stack by four fingers 36 of resilient materials, such as spring steel, having one end of each finger 36 secured to a bar 37 adjustably mounted in slideways 38, FIGURE 4, on the upper face of a platform 39 having sleeves 40 on the bottom face of said platform 39 slideably mounted on rods 41 supported at the opposite ends in the beams 15. The opposite end of each finger 36 is provided with a downwardly curved edge 42 to facilitate retrograde movement of the fingers and a raised edge 43 to engage the rear edge of the bottom paper sheet s, as shown in FIGURES 1 and 5. The bar 37 is above the platform 14 and the platform 39 is below the platform 14 with the slideways 38 extended through the platform 14, as shown in FIGURES 3 and 5. The bottom face of the platform 39 is also provided with a rack 44 midway between the sleeves 40 for the engagement of a pinion 45 secured on a shaft 46 rotatably supported at its ends in bearings 47 mounted on the side walls 12, as shown in FIGURES 3, 4 and 5. The shaft 46 is continuously rocked by a crank comprising an arm 48 secured on the shaft 46 and pivotally connected to an arm 49 eccentrically connected to a disc 50 secured on a shaft 51 rotatably mounted in a bracket 52 supported between the side walls 12. Continuous rotation is imparted to the shaft 51 by a sprocket wheel 53 keyed to the shaft 51 and engaged by a sprocket chain 54 engaging a sprocket wheel 55 secured on a shaft 56 rotated by an electric motor 57 mounted on the table 11. The shaft 56 is rotated by the electric motor 57 through a gear 58 secured on a drive shaft 59 of motor 57 and the gear 58 meshing with a gear 60 secured on the shaft 56, as shown in FIGURES 3, 4, 5, 6 and 9.

The fingers 36 will advance the lowermost paper sheet s through the space between the platform 14 and the lower edges of the front guide members 28 into the bite between two series of spaced mating rollers 61 and 62. Rollers 61 are secured on a shaft 63 rotatably supported at each end portion in one arm of a bell-crank lever 64 pivotally supported by a pintle 65 secured in each side wall 12, as shown in FIGURE 4. The other arm of each of the bell-crank levers is pivotally connected to an adjustment screw 66 adjustably mounted in a bracket 67 extended from each of the side walls 12 and retained in adjusted position by lock-nuts 68. The rollers 62 are secured in spaced relation on a shaft 69 rotatably mounted at its end portions in bearings 70 on the side walls 12, as shown in FIGURE 3. The rollers 61 and 62 are continuously rotated in opposite directions to impart forward movement to the lowermost paper sheet s from the shaft 56 by a sprocket wheel 71, FIGURES 6 and 9, secured on the shaft 56 and engaged by a sprocket chain 72 engaging a sprocket wheel 73 secured on a shaft 74 rotatably mounted at its end portions in bearings 75 on the side walls 12, FIGURES 3 and 5. Rotation of the shaft 74 is transmitted to the shaft 69 by a sprocket chain 76 engaging a sprocket wheel 77 secured on the shaft 74 and said sprocket chain 76 engaging a sprocket wheel 78 secured on the shaft 69. The rotation of the shaft 69 is in a counter-clockwise direction, looking at FIGURES 2 and 5, and said direction of rotation is transmitted to the shaft 63 of the rollers 61 to rotate said shaft 63 and rollers 61 in a clockwise direction. This is accomplished by extending one of the pintles 65, FIGURE 4, and rotatably mounting a sprocket wheel 79 on said extension and engaging a sprocket chain 80 on said sprocket wheel 79 and on a sprocket wheel 81 secured on the shaft 69 to rotate said extended spindle 65 in a counterclockwise direction. The rotation of the sprocket wheel 79 is transmitted to the shaft 63 to rotate said shaft 63 in a clockwise direction by a gear 82 rotatable on the extended spindle 65 and keyed to the sprocket wheel 79 and the gear 82 meshing with a gear 83 secured on the shaft 63, FIGURES 2 and 4.

The rollers 61 and 62 will feed the lowermost sheet s to *a* mating series of equidistantly spaced belts 84 and 85, belts 84 travelling around pulleys 86 and 87 secured to shafts 88 and 89, respectively. Shaft 88 is rotatably supported at the opposite ends in one end of a pair of levers 90 pivotally mounted at 91 on the side walls 12 and said shaft 88 is adjusted by adjusting screws 92 rotatably supported in brackets 93 on the side walls 12 and adjustably connected to the opposite end of the levers 90, as shown in FIGURES 1 and 2. The opposite ends of the shaft 89 are rotatably mounted in bearing blocks 94 slidable in slideways 95 arranged in the side walls 12. The bearing blocks 94 are adjusted in the slideways 95 by adjustment screws 96 rotatably supported in plates 97 spanning the slideways 95 and said adjustment screws 96 adjustably connected to the bearing blocks 94. The adjustment of the adjustment screws 92 and 96 will space the belts 84 from the belts 85 to accommodate [papers] *paper* sheets of different thickness. The belts 85 travel around the pulleys 98 and 99 secured on the shafts 100 and 101, respectively, the opposite ends of the shafts 100 and 101 being rotatably supported in the side walls 12. The shaft 89 is rotated in a clockwise direction, looking at FIGURES 2 and 6, by a sprocket chain 102 engaging a sprocket wheel 103 secured on an end portion of the shaft 63 extending from a side wall 12 and said sprocket chain 102 also engaging a sprocket wheel 104 secured on the shaft 89. The shaft 101 is rotated in a counter-clockwise direction by a sprocket chain 105 engaging a sprocket wheel 106 secured on an end portion of the shaft 69 and a sprocket wheel 107 secured on a projecting end portion of the shaft 101, as shown in FIGURE 2. The pulleys 86 and 98 are of the same diameter and considerably smaller than the diameters of the pulleys 87 and 99 which are of the same diameter.

Figure 6:
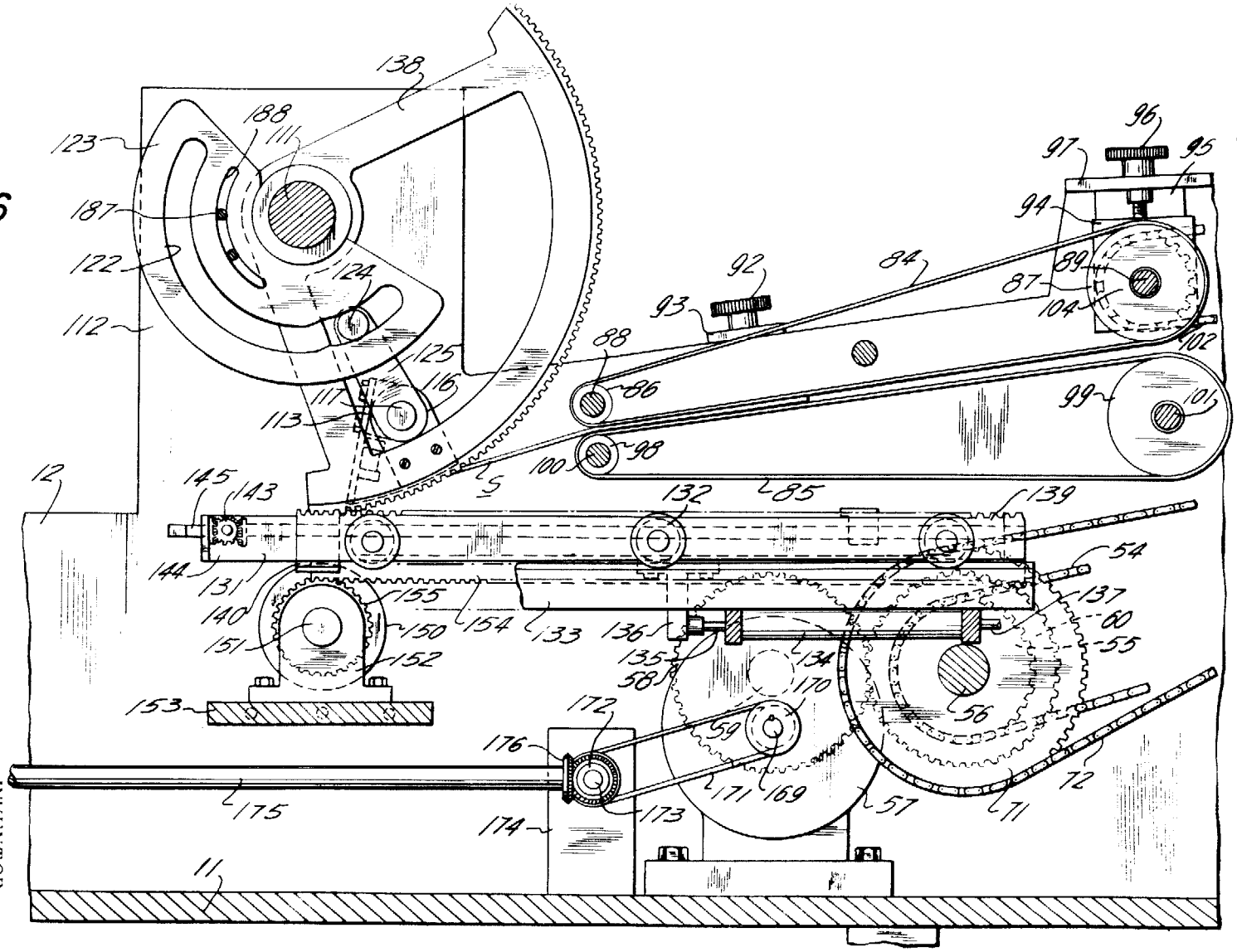
FIGURE 6 is a side elevational view, on an enlarged scale, looking from the line 6—6 of FIGURE 1 in the direction of the arrows to show the pressure applying member, the die bed and the roller supporting the die bed with the pressure applying member and the die bed in their initial position receiving a paper sheet from the mating endless belts.
Figure 7:
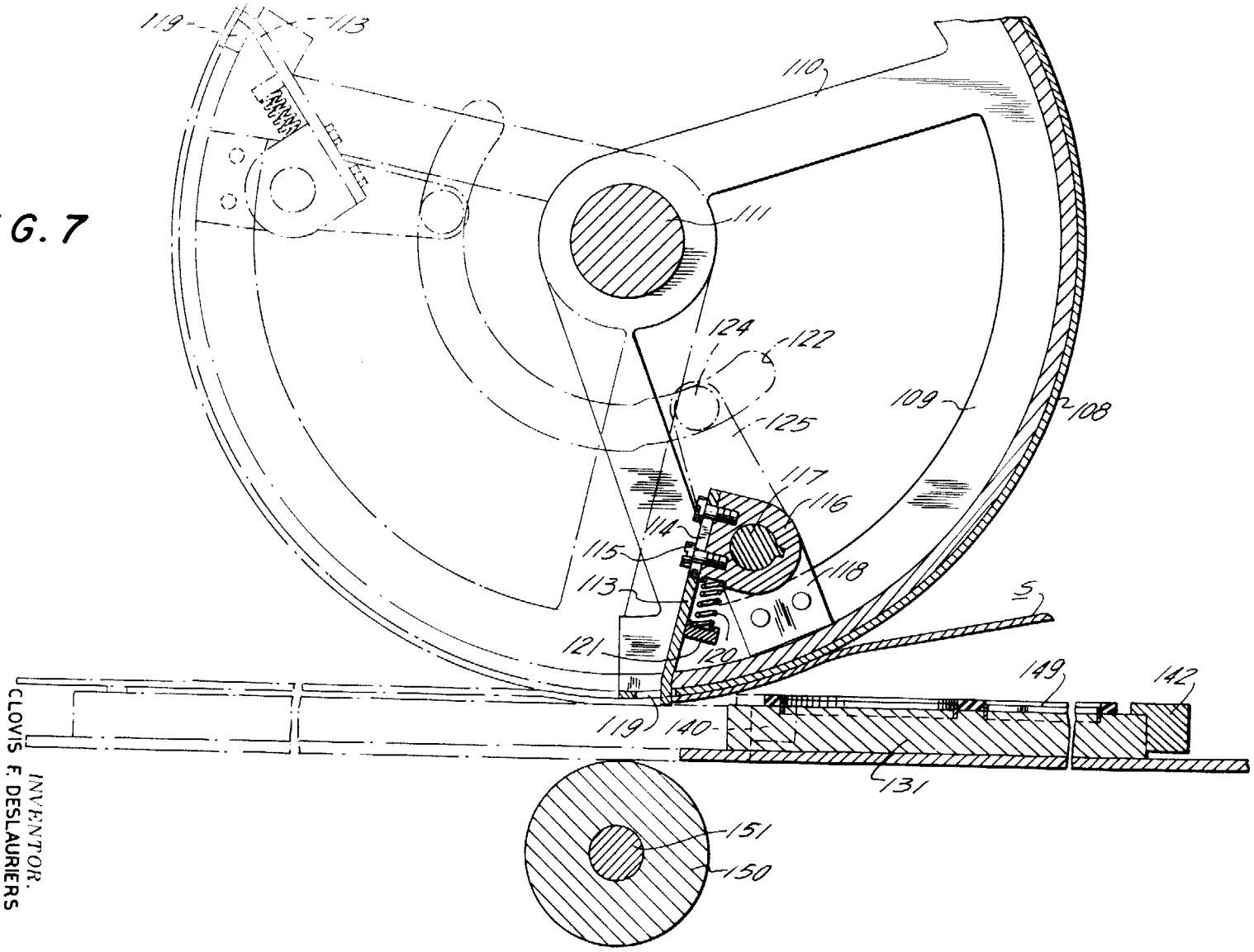
FIGURE 7 is a sectional view, on an enlarged scale, taken on the line 7—7 of FIGURE 1 looking in the direction of the arrows to show one of the cam actuated stops and the arcuate surface of the pressure applying member.
Figure 8:
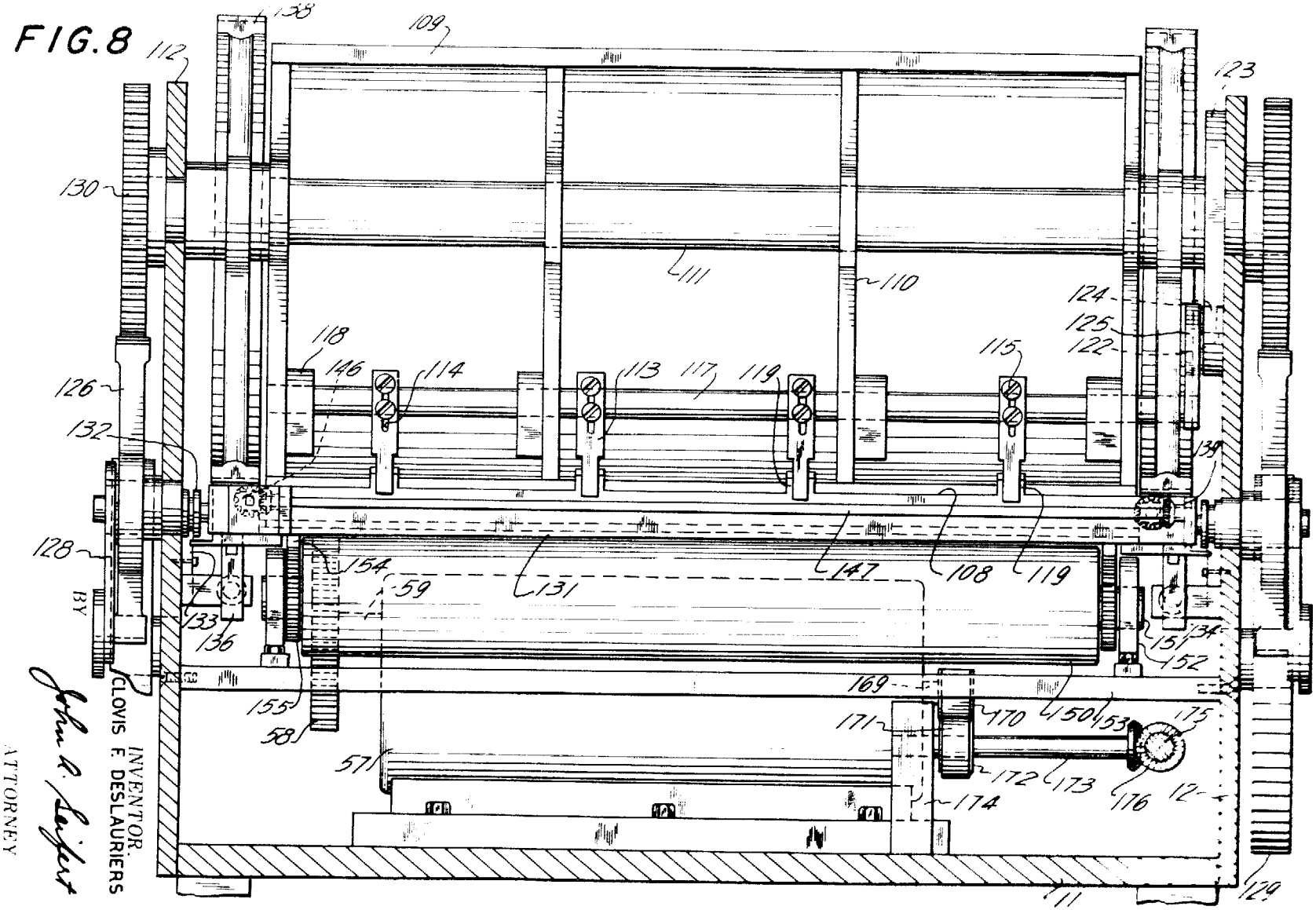
FIGURE 8 is a cross-sectional view, on an enlarged scale, taken on the line 8—8 of FIGURE 1 looking in the direction of the arrows to show the cranks, toothed segments, pinions and racks for actuating the pressure applying member, the die bed and the roller.

The belts 84 and 85 deliver the lowermost paper sheet s to a pressure applying member and a *pressure receiving means which may be a* die bed. The pressure applying member comprises an arcuate surface 108 mounted on a segmental member 109 having spokes 110 secured on a shaft 111 rotatably mounted at the opposite end portions in vertical extensions 112 of the side walls 12. The lower end portion of the arcuate surface 108 in the paper sheet receiving position thereof is provided with equidistantly spaced paper sheet stops comprising fingers 113 having slots 114 for the sliding mounting of said fingers 113 on bolts 115 having a smooth throat in said slots 114 and threaded in collars 116 keyed on a shaft 117 rotatably supported in bearings 118 mounted on the segmental member 109. The tips of the fingers 113 extend through openings 119 in the arcuate surface 108 and the segmental member 109 to engage the leading edge of the lowermost paper sheet s, as shown in FIGURE 7. The tips of the fingers 113 are yieldingly urged outwardly from the arcuate surface 108 by a spring 120 compressed between a lug 121 extended from each finger 113 and each collar 116. The springs 120 also permit the fingers 113 to be moved within the openings 119 should the tips encounter an obstacle. The tips of the fingers 113 are also positively moved within the arcuate surface 108, as shown in broken lines in FIGURE 7, by a cam groove 122 in a plate 123 adjustably mounted on the inner face of one of the side wall extensions 112 by bolts 187 slidingly engaged in a slot 188 in the plate 123 and threaded in said side wall extension 112, as shown in FIGURES 6 and 8. A cam follower 124 is engaged in the cam groove 122 and is mounted on the end of an arm 125 secured to an end of the shaft 117. The arcuate surface 108 and the segmental member 109 are [rocked to and fro] *oscillated* from the full line position to the broken line position shown in FIGURE 7 by a toothed segment 126 rotatably mounted on each side wall 12 in vertical alignment below the shaft 111 and having a crank arm 127 pivotally connected to a pitman 128 pivotally connected to a fly-wheel 129 secured to each end of the shaft 56 extended from the side walls 12, as shown in FIGURES 2 and 9. [Rotary reciprocation or to and fro] *Oscillation movement* is imparted to the arcuate surface 108 by the toothed segment 126 meshing with a gear 130 keyed to each projecting end portion of the shaft 111.

The arcuate surface 108 co-operates and *oscillates* [moves to and fro] with a die bed 131 reciprocally supported by rollers 132 rotatably mounted on the opposite sides of the die bed and riding on rails 133 supported by the side walls 12, as shown in FIGURES 1, 6, 8 and 9. The retrograde movement of the die bed 131 is limited by an air-cushioned stop comprising a cylinder 134 mounted on each side wall 12 and having a piston 135 engaged by an abutment 136 depending from the die bed 131 adjacent each side of said die bed. The cylinder is connected in communication with a source of air pressure, not shown, by a hose 137, FIGURE 6. The die bed is reciprocated in synchronism with the [to and fro] *oscillation* [movement] of the arcuate surface 108 by a toothed segment 138 secured on the shaft 111 on each side of the segmental member 109 and extending in the same arc as the arcuate surface 108 but of greater length to assure full movement to said arcuate surface 108 and the die bed 131. Said toothed segment 138 meshes with a rack 139 mounted on the die bed 131 adjacent each side thereof and said rack 139 being of greater length than the die bed 131. The die bed 131 is arranged with a die locking frame having a front member 140, two side members 141 secured to the opposite ends of the front member 140 and a rear locking bar 142 adjustable longitudinally of the side members 141 toward and away from the front member 140. The locking bar 142 is adjusted by miter-gearing 143 supported in a bracket 144 extended from the front member 140 adjacent a side member 141 and actuated by a tool engaging shank 145 connected to one of the miter-gears. The miter-gearing 143 is connected to miter-gearing 146 supported by the front member 140 and the other side member 141 by a shaft 147 extending parallelly of the front member 140. The miter-gearing 143 and 146 are provided with shafts 148 extending along the side members 141 and having screw-threads adjustably engaging the locking bar 142 whereby turning of the shank 145 in one direction will move the locking bar 142 toward the front member 140 and the turning of the shank 145 in the opposite direction will move the locking bar 142 away from the front member 140 to clamp dies of different sizes to the bed 131. The die is shown at 149 in FIGURE 9 clamped to the bed 131. The racks 139 are mounted on the side members 141 of the die frame.

Figure 9:
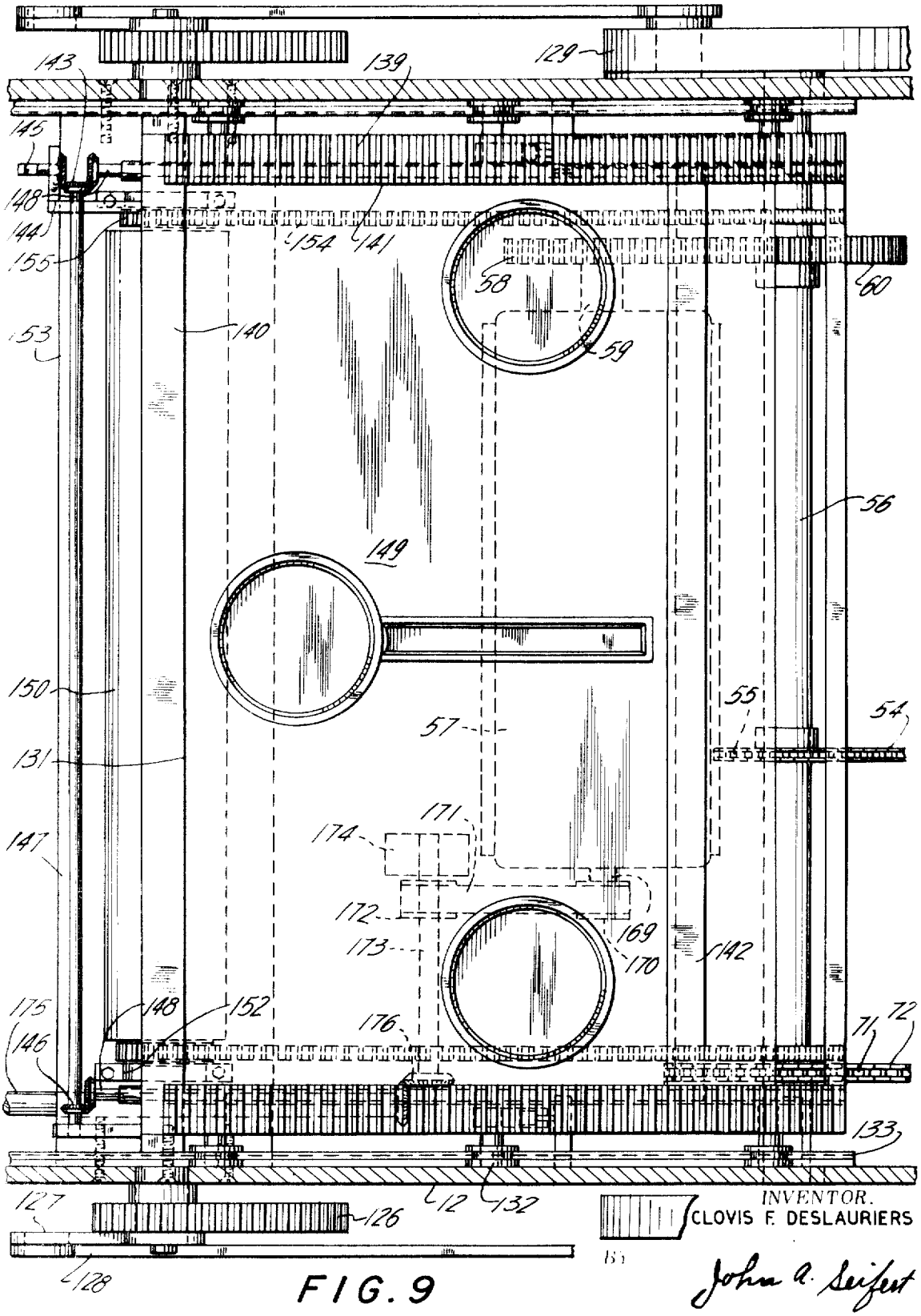
FIGURE 9 is a top plan view, on an enlarged scale, of the die bed.

During the die cutting and scoring operation, the die bed 131 is supported by a roller 150 secured on a shaft 151 rotatably mounted in bearings 152 supported by *support means which may be* a transverse member 153 secured to the side walls 12, as shown in FIGURES 6, 8 and 9. The roller 150 is [rotated to and fro] *oscillated* in synchronism with the movements of the arcuate surface 108 and the die bed 131 by racks 154 mounted on the bottom of the die bed 131 and meshing with pinions 155 secured on the opposite end portions of the shaft 151.

Figure 10:
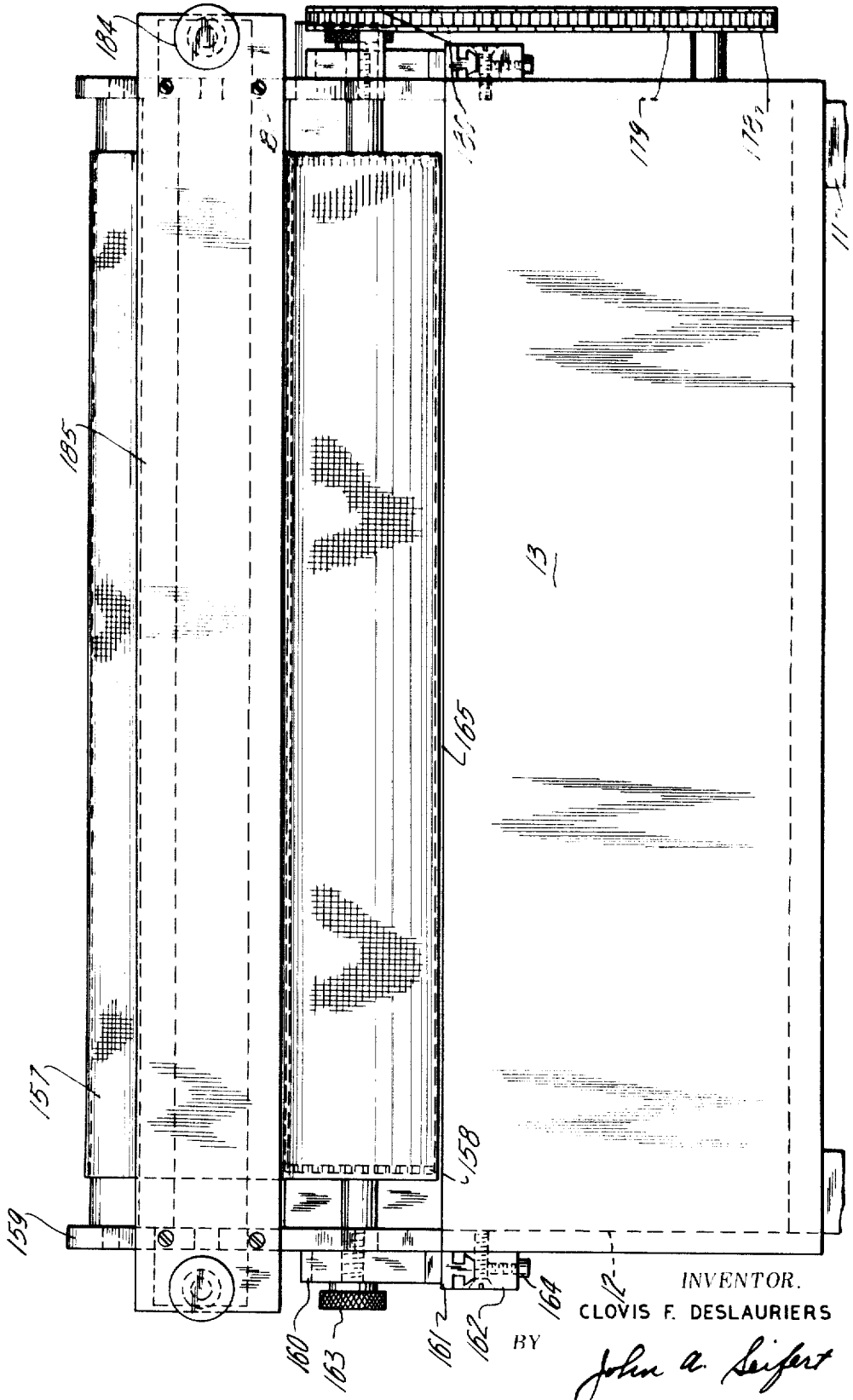
FIGURE 10 is a front elevational view, on an enlarged scale, looking from the line 10—10 of FIGURE 2 in the direction of the arrows to show the perforated web and means to adjust the tension of said web.

After the paper sheet s is cut and scored, the arcuate surface 108 and the die bed 131 are in their extreme forward position with the arcuate surface 108 free of the die bed 131, as shown in the broken line positions in FIGURE 7, and the tips of the top fingers 113 are within the openings 119 in the arcuate surface 108. In this position of the arcuate surface 108, the cut and scored paper sheet s will remain on the die bed in its extreme forward position below a horizontal section 165 of an endless perforated web 157 supported over rollers 158 rotatably mounted in and between spaced walls 159 adjustably mounted on brackets 160 secured on slides 161 engaged in slideways 162 secured to the side walls 12. The brackets 160 are provided with slots for the engagement of locking screws [extnded] *extended* through the slots and threaded in the side walls, as shown at 163 in FIGURES 1, 2 and 10, so that the walls 159 are adjusted towards and away from the tops of the side walls 12. The walls 159 are adjusted towards and away from the vertical extensions 112 by adjusting the slides 161 in the slideways 162 and securing the slides 161 in the slideways 162 by set-screws 164. The cut and scored paper sheet will be moved by the travel of the perforated web 157 and means are provided to retain said cut and scored paper sheet on the perforated web 157 in said horizontal position. Said means comprises a casing 166 secured to the walls 159, as shown at 167 in FIGURE 2, and having an open bottom extending along the upper or inner surface of the horizontal section of the perforated web 157. The casing is connected to suction means, not shown, through a nozzle 168 in a side-wall of the casing 166 and the adjacent wall 159, so that the suction in casing 166 will keep the cut and scored paper sheet on the horizontal section of the perforated web 157. The continual travel of said perforated web 157 will discharge the cut and scored paper sheet from the apparatus over the front wall 13. Travel is imparted to the perforated web 157 from a shaft 169 of the motor 57, said shaft 169 having a pulley 170 keyed thereto and a belt 171 engaging said pulley 170 and a pulley 172 secured on a shaft 173 supported by a bearing 174 mounted on the table 11, as shown in FIGURES 6, 8 and 9. The shaft 173 is connected to a shaft 175 through miter-gearing 176 and said shaft 175 is connected to a gearing box 177, as shown in FIGURE 1, mounted on a side wall 12. A sprocket wheel 178 is secured on the drive shaft of the gear box and engaged by a sprocket chain 179 engaging a sprocket wheel 180 secured on a projecting end of a shaft of one of the rollers 158, as shown in FIGURES 1, 2 and 10. The perforated web 157 is kept taut by a roller 181 on a pair of slides 182 in slideways 183 in the walls 159 with the roller 181 contacting the outer surface of the perforated web 157. The slides 182 are adjusted in the slideways 183 by screws 184 rotatably mounted in the opposite end portions of a plate 185 secured on the front edges of the walls 159, and the screws 184 are threaded in ears 186 extended from the slides 182.

Having thus described my invention, I claim:

[1. In apparatus for die cutting and scoring paper sheets, a reciprocating pressure applying member, a die bed reciprocally mounted below the pressure applying member and operatively connected to the pressure applying member to reciprocate synchronously with the pressure applying member, and a rotary member mounted in contact with the underface of the die bed and operatively connected to said die bed to reciprocally rotate synchronously with the pressure applying member and the die bed and maintain the die bed in paper sheet cutting and scoring position relative to the pressure applying member.]

[2. Apparatus for die cutting and scoring paper sheets as claimed in claim 1, wherein said pressure applying member is provided with cam actuated stops to position a paper sheet on the pressure applying member and the die bed.]

[3. Apparatus for die cutting and scoring paper sheets as claimed in claim 1, wherein the pressure applying member comprises an arcuate surface pivotally mounted on an axis extending in a horizontal plane transverse of the path of reciprocation of the die bed.]

[4. Apparatus for die cutting and scoring paper sheets as claimed in claim 1, wherein the pressure applying member is provided with a first toothed sector, and the die bed is provided with a rack meshing with said first toothed sector of the pressure applying member.]

[5. Apparatus for die cutting and scoring paper sheets as claimed in claim 1, wherein the die bed is provided with a second rack, and the rotary member is arranged with a pinion meshing with said second rack of the die bed.]

[6. In apparatus for die cutting and scoring paper sheets as claimed in claim 1, a motive means operatively connected to the pressure applying member to synchronously reciprocate the die bed and reciprocally rotate the rotary member.]

[7. In apparatus for die cutting and scoring paper sheets as claimed in claim 4, motive means comprising a crank and a second toothed sector operatively connected to said crank, and a pinion connected to the first toothed sector to move synchronously with said first toothed sector and meshing with the second toothed sector.]

[8. In apparatus for die cutting and scoring paper sheets as claimed in claim 1, an air cushioned stop mounted below the path of travel of the die bed and arranged to limit the retrograde travel of said die bed.]

[9. In apparatus for die cutting and scoring paper sheets as claimed in claim 1, means for supporting a stack of paper sheets spaced rearwardly of the pressure applying member, the die bed and the rotary member; and means to deliver the lowermost paper sheet from the stack to a position between the pressure applying member and the die bed in their retrograde positions.]

[10. Apparatus for die cutting and scoring paper sheets as claimed in claim 9, wherein the means for supporting a stack of paper sheets comprises a platform, fixed side walls extending above the platform, rear guide members adjustably supported by the side walls and arranged to support the rear edge portions of the paper sheets in raised position from the platform, front guide members adjustably supported by the side walls and adjusted to space the bottom edges from the platform to accommodate paper sheets of different thicknesses, and side guide members adjustably supported by the side walls and adjusted for different widths of paper sheets.]

[11. Apparatus for die cutting and scoring paper sheets as claimed in claim 9, wherein the means to deliver the lowermost paper sheet from the stack to a position between the pressure applying member and the die bed comprises paper sheet feeding fingers reciprocated below the stack and arranged to remove the lowermost paper sheet, mating rollers rotated in opposite directions in front of the stack to receive and advance the lowermost paper sheet from the fingers, and two series of mating endless belts travelling in opposite directions from the the mating rollers to adjacent the pressure applying member and the die bed to deliver the lowermost paper sheet between said pressure applying member and the die bed.]

[12. In apparatus for die cutting and scoring paper sheets as claimed in claim 1, a continuously travelling endless perforated web having a section travelling in a horizontal plane above the die bed in its extreme forward position, and suction means positioned above the horizontal section of the web to transfer the cut and scored paper sheet from the die bed to the horizontal section of the web and retain the cut and scored paper sheet on said horizontal section of the web, the continuous travelling of the web discharging the cut and scored paper sheet from the apparatus.]

*13. In an apparatus for die cutting and scoring paper sheets,*

*(A) an oscillating pressure applying member,*

*(1) said pressure applying member being provided with cam actuated stops to position the paper sheets on the pressure applying member;*

*(B) a die bed reciprocally mounted below the pressure applying member,*

*(1) said die bed being operatively connected to the pressure applying member to reciprocate synchronously with the pressure applying member,*

*(2) said cam actuated stops positioning the paper sheets on the die bed; and*

*(C) a rotary member mounted in contact with the underface of the die bed,*

*(1) said rotary member being operatively connected to the die bed to oscillate synchronously with the pressure applying member and the die bed,*

*(2) said rotary member maintaining the die bed in paper sheet cutting and scoring position relative to the pressure applying member.*

*14. Apparatus for die cutting and scoring paper sheets as claimed in claim 13, wherein the pressure applying member is provided with a first toothed sector, and the die bed is provided with a rack meshing with the said first toothed sector.*

*15. Apparatus for die cutting and scoring paper sheets as claimed in claim 14, including motive means comprising a crank and a second toothed sector operatively connected to the crank, and a pinion connected to the first toothed sector to move synchronously with the first toothed sector and meshing with the second toothed sector.*

*16. In apparatus for die cutting and scoring paper sheets as claimed in claim 13, means for supporting a stack of paper sheets spaced rearwardly of the pressure applying member, the die bed and the rotary member, said means comprising a platform, fixed side walls extending above the platform, rear guide members adjustably supported by the side walls and arranged to support the rear edge portions of the paper sheets in raised position from the platform, front guide members adjustably supported by the side walls and adjusted to space the bottom edges from the platform to accommodate paper sheets of different thicknesses, and side guide members adjustably supported by the side walls and adjusted for different widths of paper sheets; and means to deliver the lowermost paper sheet from the stack to a position between the pressure applying member and the die bed in their retrograde positions.*

*17. Apparatus for die cutting and scoring paper sheets as claimed in claim 16, wherein the means to deliver the lowermost paper sheet from the stack to a position between the pressure applying member and the die bed comprises paper sheet feeding fingers reciprocated below the the stack to receive and advance the lowermost paper sheet mating rollers rotated in opposite directions in front of the stack to receive and advance the lowermost paper sheet from the fingers, and two series of mating endless belts travelling in opposite directions from the mating rollers to adjacent the pressure applying member and the die bed to deliver the lowermost paper sheet between the said pressure applying member and the die bed.*

*18. In apparatus for die cutting and scoring paper sheets as claimed in claim 13, a continuously travelling endless perforated web having a section travelling in a horizontal plane above the die bed in its extreme forward position, and suction means positioned above the horizontal section of the web to transfer the cut and scored paper sheet from the die bed to the horizontal section of the web and retain the cut and scored sheet on said horizontal section of the web, the continuous travelling of the web discharging the cut and scored paper sheet from the apparatus.*

*19. In an apparatus for die cutting paper sheets, the combination of*

*(A) sheet feed means to feed paper sheets into the apparatus,*

*(1) said sheet feed means including means to feed sheets individually,*

*(B) a pressure applying member contacting each sheet as it is fed into the apparatus,*

*(1) said pressure applying member having oscillating movement above each sheet,*

*(2) said pressure applying member being provided with stops to position a paper sheet on the pressure applying member and on a die bed;*

*(C) a die bed positioned below the pressure applying member,*

*(1) said die bed having a top surface and an underside,*

*(2) said die bed being operatively connected to the pressure applying member to reciprocate synchronously with the pressure applying member,*

*(3) each said sheet being moved between the pressure applying member and the top surface of the die bed,*

*(4) each sheet being simultaneously contacted by the pressure applying member and the die bed as the sheet passes through the apparatus; and*

*(D) support means mounted in contact with the underside of the die bed to support the die bed,*

*(1) said support means maintaining the die bed in paper sheet cutting position relative to the pressure applying member.*

References Cited

The following references, cited by the Examiner, are of record in the patented file of this patent or the original patent.

UNITED STATES PATENTS

| | | | |
|---|---|---|---|
| 2,168,401 | 8/1939 | Evers | 83—284 |
| 3,453,916 | 7/1969 | Green | 83—614 X |
| 2,751,003 | 6/1956 | Mueller | 83—284 |
| 736,217 | 8/1903 | Clark | 100—156 |
| 2,405,868 | 8/1946 | Whittaker et al. | 83—284 X |
| 2,679,291 | 5/1954 | Collinson | 83—284 |
| 3,283,918 | 11/1966 | Devol | 83—318 X |
| 3,336,865 | 8/1967 | Brand | 100—156 X |
| 1,956,228 | 4/1934 | Sidebotham | 93—58 |
| 2,776,610 | 1/1957 | Roselius | 83—510 X |
| 2,892,390 | 6/1959 | Wittrock | 93—58 |

FOREIGN PATENTS

| | | |
|---|---|---|
| 551,073 | 12/1957 | Canada. |

FRANK T. YOST, Primary Examiner

U.S. Cl. X.R.

83—152, 284, 318, 396, 417, 419, 422, 431